US008728270B2

(12) United States Patent
Schuelke et al.

(10) Patent No.: US 8,728,270 B2
(45) Date of Patent: May 20, 2014

(54) WATER-RESISTANT CORRUGATED PAPERBOARD AND METHOD OF PREPARING THE SAME

(75) Inventors: Robert G. Schuelke, Niles, MI (US); Anthony L. Shoemaker, Carlisle, OH (US)

(73) Assignee: E-Cooler, L.L.C., Plymouth, IN (US)

( * ) Notice: Subject to any disclaimer, the term of this patent is extended or adjusted under 35 U.S.C. 154(b) by 385 days.

(21) Appl. No.: 12/835,718

(22) Filed: Jul. 13, 2010

(65) Prior Publication Data

US 2011/0008585 A1 Jan. 13, 2011

Related U.S. Application Data

(60) Provisional application No. 61/225,204, filed on Jul. 13, 2009.

(51) Int. Cl.

| | |
|---|---|
| ***B41J 2/16*** | (2006.01) |
| ***C09J 4/00*** | (2006.01) |
| ***C09J 201/00*** | (2006.01) |
| ***B32B 3/28*** | (2006.01) |
| ***B32B 3/30*** | (2006.01) |

(52) U.S. Cl.

USPC ............................ 156/326; 156/336; 428/182

(58) Field of Classification Search

USPC .................................. 156/326, 336; 428/182

See application file for complete search history.

(56) References Cited

U.S. PATENT DOCUMENTS

| | | | | |
|---|---|---|---|---|
| 6,113,981 | A * | 9/2000 | Ogilvie et al. | |
| 2005/0229814 | A1* | 10/2005 | Muvundamina | 106/211.1 |
| 2010/0189961 | A1* | 7/2010 | Bugas et al. | 428/182 |

OTHER PUBLICATIONS

Dejong et al., "Wax replacement specailty formulated corrugating adhesive", provision U.S. Appl. No. 61/143,505, filed Jan. 9, 2009.*

* cited by examiner

*Primary Examiner* — Michael Orlando

(74) *Attorney, Agent, or Firm* — Howard & Howard Attorneys PLLC

(57) ABSTRACT

A method of preparing water-resistant corrugated paperboard includes providing a corrugated medium treated with a water-proofing agent on both sides thereof, and providing a liner treated with the water-proofing agent on at least an inner surface thereof. The liner and corrugated medium are adhered, with the inner surface of the liner adhered to the corrugated medium. The liner and corrugated medium are adhered with an adhesive composition comprising carrier starch, uncooked pearl starch, borax, a water-proofing resin, a penetration-enhancing additive, and water. The carrier starch comprises cooked starch and uncooked starch. The liner and corrugated medium are treated with the water-proofing agent prior to adhering the liner and corrugated medium. Due to the use of the particular adhesive composition for adhering the liner and the corrugated medium, use of liner treated with the water-proofing agent is possible with acceptable bonding and preservation of Cobb ratings.

10 Claims, 2 Drawing Sheets

FIG. 2B
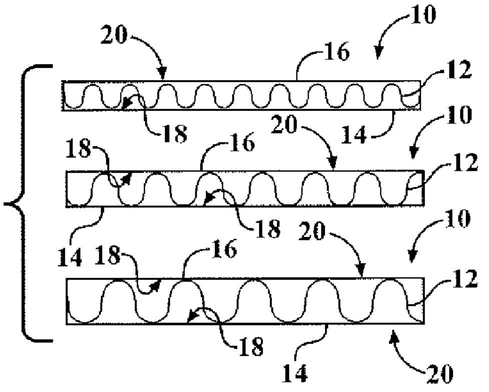
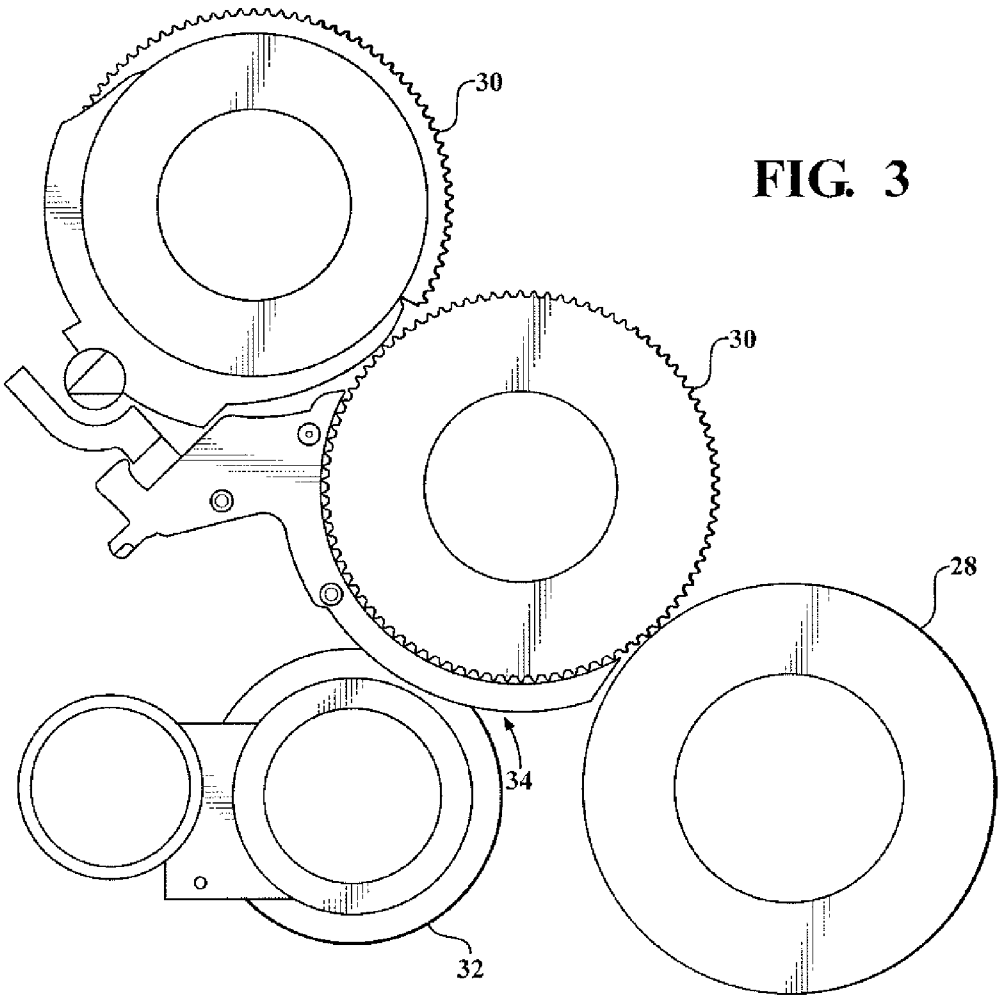
FIG. 3

WATER-RESISTANT CORRUGATED PAPERBOARD AND METHOD OF PREPARING THE SAME

CROSS-REFERENCE TO RELATED APPLICATION

This application claims priority to and all the advantages of U.S. Provisional Patent Application No. 61/225,204, filed on Jul. 13, 2009.

BACKGROUND OF THE INVENTION

1. Field of the Invention

The instant invention generally relates to water-resistant corrugated paperboard and a method of preparing the same. More specifically, the instant invention relates to a method of preparing water-resistant corrugated paperboard from sheets that are pre-treated for water-resistance prior to adhering the sheets to form the corrugated paperboard.

2. Background of the Related Art

Water-resistant corrugated paperboard is manufactured and used for shipping produce, wet iced poultry, meat boxes, and a variety of other end uses where the board is exposed to water or high humidity. Conventional water-resistant corrugated paperboard is generally prepared by first assembling the various layers of the corrugated paperboard in a corrugator using specially-formulated adhesives that have higher resistance to water than conventional paperboard adhesives.

Water-resistant paperboard adhesive is prepared through a variety of techniques that generally focus on a higher rate of carrier application and higher solids content. Stein-Hall adhesives are generally used for the water-resistant paperboard adhesive. As known in the art, a Stein-Hall adhesive uses a small portion of cooked carrier starch to suspend and carry uncooked starch. The Stein-Hall adhesive also uses caustic soda (sodium hydroxide) to help cook the carrier starch, and borax to increase tack and cohesiveness. These three raw materials, and water, are the main ingredients for all corrugating adhesives. Their consistency will affect the quality, stability, and running qualities of the finished adhesive.

In order to impart water-resistant properties to the corrugated paperboard, it is know to add a conventional water-proofing resin to the Stein-Hall adhesive. A wide variety of such water-proofing resins are known in the art including recorcinol formaldehyde resins, urea formaldehyde resins and ketone aldehyde resins, e.g., acetone formaldehyde resins.

In one known process, the resulting corrugated paperboard is treated with wax to impart water-resistant properties thereto. In another embodiment, outer surfaces of the liners (i.e., surfaces of the liners that are not adhered to the corrugated medium) are treated with a water-proofing agent prior to assembling the various layers of the corrugated paperboard in the corrugator. However, inner surfaces of the liners and the have not been treated with water-proofing agents in the past due to difficulties associated with adequately adhering the liners to the corrugated medium that is treated with the water-resistant coatings. Further, other considerations have also hindered the development of methodologies for adhering liners to corrugated medium with the inner surfaces of the liners and the corrugated medium treated with the water-proofing agent. Such further considerations include preservation of sufficient Cobb ratings of the resulting corrugated paperboard and prevention of stack lamination when the resulting corrugated paperboards are stacked upon each other after production. Stack lamination is a risk due to the fact that excessively high temperatures of the corrugated paperboard could cause melting and bonding of the stacked corrugated paperboards due to the treatment of the liners with the water-proofing agent, thereby adhering the separate corrugated paperboard in the stack and rendering separation of the corrugated paperboard impossible.

In view of the foregoing, there remains an opportunity to develop a method of preparing water-resistant corrugated paperboard that overcomes the barriers that previously prevented assembly of liners and corrugated medium with the inner surfaces of the liners and the corrugated medium treated with the water-proofing agent.

SUMMARY OF THE INVENTION AND ADVANTAGES

The instant invention provides water-resistant corrugated paperboard and a method of preparing the same. The method includes providing a corrugated medium treated with a water-proofing agent on both sides thereof, and providing a liner treated with the water-proofing agent on at least an inner surface thereof. The liner and corrugated medium are adhered, with the inner surface of the liner adhered to the corrugated medium. The liner and corrugated medium are adhered with an adhesive composition comprising carrier starch, uncooked pearl starch, borax, a water-proofing resin, a penetration-enhancing additive, and water. The carrier starch comprises cooked starch and uncooked starch. The liner and corrugated medium are treated with the water-proofing agent prior to adhering the liner and corrugated medium.

Due to the use of the particular adhesive composition for adhering the liner and the corrugated medium, use of liner treated with the water-proofing agent is possible with acceptable bonding between the liner and the corrugated medium. Further, Cobb ratings of the resulting water-resistant corrugated paperboard are preserved through the method of the instant invention.

DESCRIPTION OF THE DRAWINGS

Other objects, features, and advantages of the present invention will be readily appreciated as the same becomes better understood while reading the subsequent description taken in conjunction with the accompanying drawings wherein:

FIG. 2B shows three schematic perspective views of different flute sizes in corrugated paperboard; and FIG. 3 is a schematic side view of single facer section of the corrugator system of FIG. 1.

DESCRIPTION OF THE INVENTION

Figure 1:
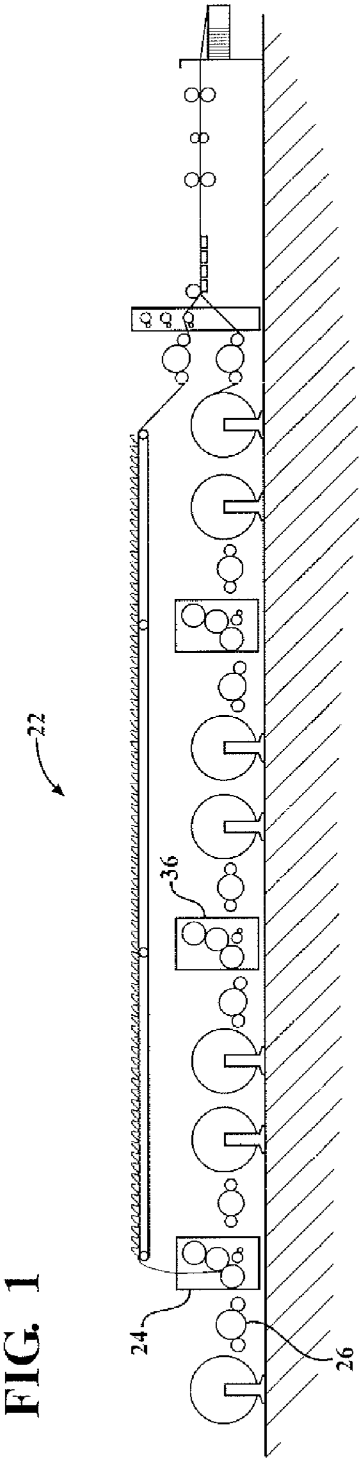
FIG. 1 is a schematic view of a corrugator system shown running a single wall of corrugated paperboard.
Figure 2A:
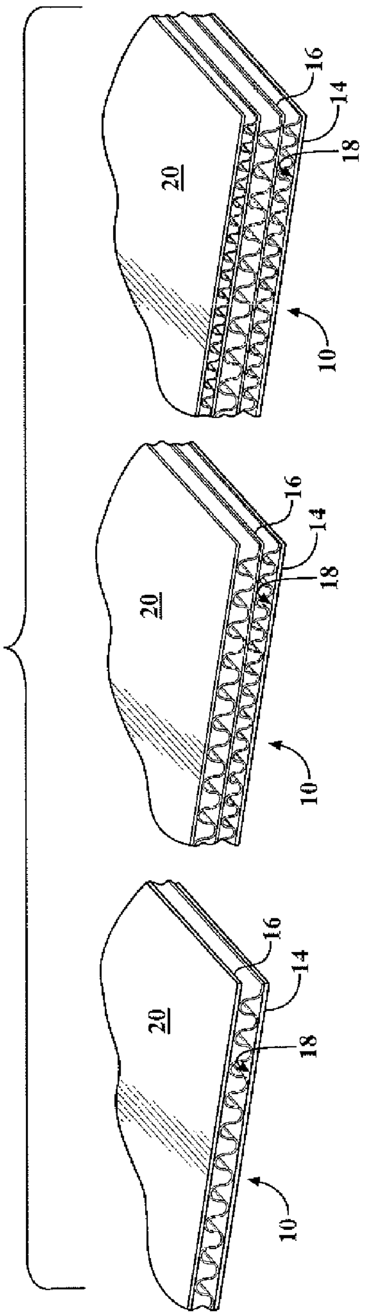
FIG. 2A shows three schematic perspective views of single, double, and triple wall corrugated paperboard.

A method of preparing water-resistant corrugated paperboard 10, in accordance with the instant invention, can be used to prepare corrugated paperboard 10 for any use known in the art for water-resistant corrugated paperboard 10, and results in water-resistant corrugated paperboard 10 that may have enhanced properties relative to Cobb rating and resistance to water over time as compared to existing water-resistant corrugated paperboard 10. The water-resistant corrugated paperboard 10 can be of any configuration as known in the art, and may include single wall or multiple wall configurations as shown in FIG. 2A. Further, the water-resistant corrugated paperboard 10 can have any flute configuration and size such as A-flute, B-flute, or C-flute as such configurations are known in the art and as are generally shown in FIG. 2B.

The water-resistant corrugated paperboard 10 is prepared by providing a corrugated medium 12 and a liner 14. Typically, a second liner 16 is adhered to the corrugated medium 12 on an opposite side of the corrugated medium 12 from the liner. The corrugated medium 12 and the liner(s) 14, 16 are treated with a water-proofing agent prior to adhering the liner 14 and corrugated medium 12. Typically, the water-proofing agent is dry prior to commencing a step of adhering the liner 14 to the corrugated medium 12. The liner(s) 14, 16 is/are typically treated with a base coat composition in an amount of from about 2.5 to about 3.5 lbs per 1000 $ft^2$ of the liner(s) 14, 16, followed by treatment of the liner(s) 14, 16 with the water-proofing agent in an amount of from about 1 to about 1.5 lbs $ft^2$ of the liner(s) 14, 16. The liner 14 is typically treated with the water-proofing agent on at least an inner surface 18 thereof (i.e., a surface that is adhered to the corrugated medium 12); however, it is to be appreciated that the liner(s) 14, 16 may also be treated with the water-proofing agent on an outer surface 20 thereof that is not adhered to the corrugated medium 12. In this regard, the water-proofing agent is disposed on the surface of the liner(s) 14, 16, and may be infused into the bulk of the liner(s) 14, 16. With the liner(s) 14, 16, the water-proofing agent may partially infuse into the bulk thereof, but infusion may be controlled such that the water-proofing agent does not infuse through the entire bulk of the liner(s) 14, 16 (thereby leaving one side of the liners uncoated). The corrugated medium 12 is treated with the water-proofing agent on both sides thereof. The corrugated medium 12 may be formed from a wet slurry with the water-proofing agent present during formation of the corrugated medium 12 from the wet slurry. When formed in the presence of the water-proofing agent, the corrugated medium 12 includes the water-proofing agent present on both sides of the corrugated medium 12, with the water-proofing agent infused throughout the bulk of the corrugated medium 12. By forming the corrugated medium 12 in the presence of the water-proofing agent, the corrugated paperboard 10 exhibits enhanced water resistance over time as compared to corrugated paperboard 10 that does not include the corrugated medium 12 formed in the presence of the water-proofing agent.

The water-proofing agent may be of any type that is known in the art for coating liners for use in preparing corrugated paperboard 10. Typically, the water-proofing agent comprises a waxy material suspended in a solvent such as water. After drying the liner(s) 14, 16 and corrugated medium 12 that are treated with the water-proofing agent, the solvent is removed with the waxy material remaining on or in the liner(s) 14, 16 and corrugated medium 12. One example of a suitable waxy material, for purposes of the instant invention, is polyethylene terephthalate (PET). However, it is to be appreciated that different waxy materials can be used, and it is to be further appreciated that different water-proofing agents may be used to treat the liner(s) 14, 16 and corrugated medium 12. Liners treated with the water-proofing agent and corrugated media formed in the presence of the water-proofing agent are commercially available from Ibex.

The liner(s) 14, 16 and corrugated medium 12 are typically prepared to have a Cobb rating of no greater than about 30, typically from about 20 to about 30. More specifically, the inner surface 18(s) of the liner(s) 14, 16 and the corrugated medium 12 typically has/have a Cobb rating of no greater than 30 prior to adhering the liner(s) 14, 16 and the corrugated medium 12. However, it is to be appreciated that, under some circumstances, the liner(s) 14, 16 and/or corrugated medium 12 may have higher or lower Cobb ratings. Cobb rating for the liner(s) 14, 16 and corrugated medium 12 is a factor for gauging water resistance of the liners and corrugated medium 12 and, ultimately, for gauging the water resistance of the resulting water-resistant corrugated paperboard 10. TAPPI-T441-os-77 is employed to determine the Cobb rating. The lower Cobb ratings correspond to higher water repellency. As set forth in further detail below, the Cobb ratings of the liner(s) 14, 16 and corrugated medium 12 are retained and, in some circumstances, improved after adhering the liner(s) 14, 16 and corrugated medium 12.

An adhesive composition is provided for adhering the liner (s) 14, 16 and the corrugated medium 12. The adhesive is a Stein-Hall adhesive that includes carrier starch and uncooked pearl starch. The carrier starch comprises cooked starch and uncooked starch. The carrier starch used in the adhesive composition typically comprises modified corn starch, which provides excellent adhesion for water-proofing application and which also retains consistent physical properties for a longer period of time as compared to other types of carrier starches. The carrier starch may also comprise starch from another source, such as wheat starch or pea starch. One example of a suitable carrier starch is Fiber Tac®, which is a modified corn starch that is commercially available from Corrugated Chemicals, Incorporated of Knoxville, Tenn. A portion of the carrier starch is cooked as described in further detail below in the context of the process of preparing the adhesive composition. The adhesive composition includes water-proofing resins and penetration-enhancing additives, which are effective even with the corrugated medium 12 infused with the water-proofing agent and even with inner surface 18(s) of the liner(s) 14, 16 treated with the water-proofing agent. Suitable water-proofing resins include recorcinol formaldehyde resins, urea formaldehyde resins, and ketone aldehyde resins, such as acetone formaldehyde resins. In one embodiment, free formaldehyde is absent from the water-proofing resins. The penetration-enhancing additive also functions to enhance penetration of the adhesive into the water-proofing agent. Suitable penetration-enhancing additives include dispersions of styrene/butadiene copolymer in water. One example of a suitable penetration-enhancing additive is Super Tac®, which is commercially available from Corrugated Chemicals, Incorporated and is a 50% by weight dispersion of a styrene/butadiene copolymer in water.

The carrier starch is typically present in the adhesive composition in an amount of from about 4.5 to about 7.5 percent by weight, typically from about 5 to about 6.5 percent by weight, based on the total weight of all components used to form the adhesive composition on a pre-cooking basis. The uncooked pearl starch is typically present in the adhesive composition in an amount of from about 15 to about 25 percent by weight, typically from about 18 to 22 percent by weight, based on the total weight of all components used to form the adhesive composition on a pre-cooking basis. The water-proofing resin is typically present in the adhesive composition in an amount of from about 1.5 to about 3 percent by weight based on the total weight of all components used to form the adhesive composition on a pre-cooking basis. Likewise, the penetration-enhancing additive is typically present in the adhesive composition in an amount of from about 1.5 to about 3 percent by weight based on the total weight of all components used to form the adhesive composition on a pre-cooking basis. It is believed that the presence of the water-proofing resin, in combination with the penetration-enhancing additive, contributes to the success of the instant invention relative to achieving adhesion between the liner(s)

14, 16 and corrugated medium 12 even when the inner surface 18 of the liner(s) 14, 16 and the corrugated medium 12 are treated with the water-proofing agent as described above. The balance of the adhesive composition is water, although it is to be appreciated that additional components may be included in the adhesive composition.

The adhesive composition also uses caustic soda (sodium hydroxide) to help cook the carrier starch (to thereby form the cooked carrier starch), and borax to increase tack and cohesiveness. The caustic soda is typically used in the adhesive composition in an amount of from about 0.3 to about 0.7 percent by weight based on the total weight of all components used to form the adhesive composition on a pre-cooking basis. The borax is typically used in the adhesive composition in an amount of from about 0.1 to about 1.0 percent by weight based on the total weight of all components used to form the adhesive composition on a pre-cooking basis. A biocide agent may also be included in the adhesive composition depending upon the desired end use of the water-resistant corrugated paperboard 10. When used, the biocide agent can be added in an amount of from about 2 to about 3 percent by weight based on the total weight of all components used to form the adhesive composition on a pre-cooking basis.

To prepare the adhesive composition, in one exemplary embodiment, a first charge of water (about half of the total amount of water to be included in the adhesive composition) is included in a mixing tank with the mixing tank heated to a temperature of from about 110 to about 125° F. Upon reaching the desired temperature, the heat source is turned off and about three-quarters of the total amount of carrier starch to be included in the adhesive composition is added to the mixing tank, followed by addition of the caustic soda. The contents of the mixing tank are then mixed for a period of from about 20 to about 30 minutes to cook the carrier starch, followed by the addition of the rest of the water to be used in the adhesive composition to cool the contents of the mixing tank. The contents of the mixing tank are circulated with a circulating pump, and the uncooked pearl starch is added to the mixing tank along with the rest of the carrier starch to be included in the adhesive composition. The contents of the mixing tank are then mixed for a period of from about 8 to about 15 minutes, followed by the addition of the borax, the water-proofing resin, and the penetration-enhancing additive. The biocide agent can also be added to the mixing tank at this time. The contents of the mixing tank are then mixed for a period of about 5 to about 10 minutes. The gel temperature of the adhesive composition is from about 140 to about 150° F., typically from about 144 to about 148° F. A viscosity of the adhesive composition, after complete formation in the mixing tank, is from about 45 to about 55 seconds, as measured using a Stein-Hall cup. The adhesive composition may be kept in the mixing tank or a separate storage tank in anticipation of pumping the adhesive composition to a corrugator 22 for adhering the liner(s) 14, 16 and corrugated medium 12. Preferably, the adhesive composition is stored for no longer than about 24 hours prior to pumping the adhesive composition to the corrugator 22 for adhering the liner(s) 14, 16 and corrugated medium 12 to form the water-resistant corrugated paperboard 10.

As alluded to above, the water-resistant corrugated paperboard 10 is prepared in a corrugator 22. The corrugator 22 may be a conventional corrugator and has a single facer section 24 including a pre-heater 26, a pressure roll 28, one or more corrugator rolls 30, and an applicator roll 32. In particular, a single facer is first prepared by loading a roll of liner 14 treated with the water-proofing agent in anticipation of running the liner 14 through a single facer section 24 of the corrugator 22. Typically, the liner 14 is tested to determine which side thereof has a higher Cobb rating, with a side of the liner 14 having the higher Cobb rating aligned to be adhered to the corrugated medium 12. A roll of corrugated medium 12 is also loaded in the single facer 24 section of the corrugator 22. A starch gap 34 that controls an amount of adhesive applied to the liner 14 in the single facer section 24 of the corrugator 22 is set, with the starch gaps 34 typically being from about 0.015 to about 0.025 inches, most typically about 0.020 inches in the single facer section 24. A starch gap 34 in a double backer section 36 of the corrugator 22 is also set, with the starch gap 34 typically being from about 0.015 to about 0.025 inches, most typically about 0.018 inches in the double backer section 36 of the corrugator 22. It is to be appreciated that when multiple-walled corrugated paperboards 10 are prepared, starch gaps 34 in the other sections of the corrugator 22 may be set to similar distances as set forth above. The starch gaps 34 are considerably wider than conventional starch gaps 34 so as to enable thicker layers of the adhesive composition to be applied to the liners in the respective sections, which promotes bonding of the liners to the corrugated medium 12. Without being bound to any particular theory, it is believed that the thicker layers of the adhesive composition, in conjunction with the presence of the additives that provide water resistance to the starch, sufficiently protects the starch in the adhesive composition and enhances bonding between the liners and corrugated medium 12 even when the inner surfaces 18 of the liners and the corrugated medium 12 are treated with the water-proofing agent.

The liner(s) 14, 16 treated with the water-proofing agent may be contacted with the pre-heater 26 in the single facer 24 and double backer sections 36, prior to adhering the liner(s) 14, 16 and the corrugated medium 12, with a side of the liner(s) 14, 16 having a lower Cobb rating in contact with the pre-heater 26. The side of the liner(s) 14, 16 in contact with the pre-heater 26 will be the outer surface 20(s) of the liner(s) 14, 16. A side of the liner(s) 14, 16 having a higher Cobb rating is/are aligned to be adhered to the corrugated medium 12. In this regard, moisture in the liner(s) 14, 16 is driven by the heat from the pre-heater 26 from the outer surface 20 having the lower Cobb rating toward the inner surface 18 of the liner(s) 14, 16. Without being bound to any particular theory, it is believed that the moisture softens the fibers in the liner(s) 14, 16, with the fibers hardening along with the adhesive composition bonded thereto. As such, it is believed that driving the moisture toward the inner surface 18 of the liner(s) 14, 16 having the higher Cobb rating enables enhanced softening of the fibers at the inner surface 18, and results in a stronger bond between the liner(s) 14, 16 and the adhesive composition, even when the inner surface 18 has been treated with the water-proofing agent.

A temperature of the pre-heater 26 is typically set to a temperature of from about 340 to about 380° F., more typically from about 350 to about 370° F. A pre-conditioner for the corrugated medium 12 is set to a temperature of from about 340 to about 380° F., more typically from about 350 to about 370° F., and the corrugated medium 12 is wrapped over the pre-conditioner. A heat gun and wrapping of the liner 14 and corrugated medium 12 are used to adjust a temperature of the adhered sheets out of the single facer section 24 to a temperature of from about 190 to about 220° F., typically from about 195 to about 215° F., due to the fact that overheating may cause the adhesive bond between the liner 14 and the corrugated medium 12 to fail water resistance requirements. Likewise, a temperature of the adhered sheets exiting the double backer section 36 and entering a hot plates section of the corrugator 22 is typically adjusted to a range of from about 160 to about 190° F., typically from about 165 to about 180° F. A portion of the hot plate ballast may be raised to ensure that the temperature of the adhered sheets exiting the double backer section 36 fall within the above temperature ranges.

The pressure roll 28 in the single facer section 24 of the corrugator 22 is typically set to apply a pressure of from about 40 to about 70 psi, typically from about 45 to about 65 psi, to the liner 14 and corrugated medium 12 as those sheets are being adhered. After the liner 14 and corrugated medium 12 are adhered in the single facer section 24, the adhered sheets from the single facer section 24 form the water-resistant corrugated paperboard 10. In another embodiment, the adhered sheets are guided to a bridge, which is typically set to a speed that is from about 3 to about 5% faster than a speed at which the adhered sheets are prepared in the single facer section 24 for purposes of cooling the adhered sheets prior to further processing in the double backer section 36.

In the double backer section 36, the second liner 16 that is further adhered to the corrugated medium 12, on the opposite side thereof from the liner 14 adhered to the corrugated medium 12 in the single facer section 24, is wrapped around the pre-heater 26. The adhered sheets from the single facer section 24 are wrapped around another pre-heater 26 with wrapping set to about 50% of the pre-heater 26 to maintain a temperature of the adhered sheets of from about 220 to about 250° F., typically from about 230 to about 240° F. The adhered sheets are then further adhered with the second liner 16 to form the water-resistant corrugated paperboard 10.

After exiting the double backer section 36, the water-resistant corrugated paperboard 10 may be guided to the hot plates section, which is set to a temperature of from about 340 to about 380° F., more typically from about 350 to about 370° F.

To ensure adequate bonding between the liner(s) 14, 16 and the corrugated medium 12, maximum production speed of water-resistant corrugated paperboard 10 may be set to a speed of no greater than 300 linear feet per minute.

Once the water-resistant corrugated paperboard 10 exits the corrugator 22, sheets of the water-resistant corrugated paperboard 10 may be stacked. The adhesive composition is typically cured in the water-resistant corrugated paperboard 10 while the sheets are stacked. The sheets of the water-resistant corrugated paperboard 10 are typically aged for a period of at least 10 hours, typically at least 24 hours, to ensure proper bonding and cure within the sheets of the water-resistant corrugated paperboard 10.

The resulting water-resistant corrugated paperboard 10 has excellent physical properties, including sufficient adhesion between the liners and corrugated medium 12. Further, the water-resistant corrugated paperboard 10 generally exhibits a Cobb rating that is lower than the original Cobb ratings of the liners. Further, water-resistant corrugated paperboard 10 prepared through the instant method resists formation of pin holing.

Obviously, many modifications and variations of the present invention are possible in light of the above teachings, and the invention may be practiced otherwise than as specifically described within the scope of the appended claims. It is to be understood that the appended claims are not limited to express and particular compounds, compositions, or methods described in the detailed description, which may vary between particular embodiments which fall within the scope of the appended claims. With respect to any Markush groups relied upon herein for describing particular features or aspects of various embodiments, it is to be appreciated that different, special, and/or unexpected results may be obtained from each member of the respective Markush group independent from all other Markush members. Each member of a Markush group may be relied upon individually and or in combination and provides adequate support for specific embodiments within the scope of the appended claims.

It is also to be understood that any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

What is claimed is:

1. A method of preparing water-resistant corrugated paperboard comprising the steps of:

providing a corrugated medium treated with a water-proofing agent on both sides thereof;

providing a liner treated with the water-proofing agent on at least an inner surface thereof;

adhering the liner and corrugated medium, with the inner surface of the liner adhered to the corrugated medium, wherein the liner and corrugated medium are adhered with an adhesive composition comprising:

carrier starch comprising cooked starch and uncooked starch;

uncooked pearl starch;

borax;

a water-proofing resin;

a penetration-enhancing additive; and water;

wherein the liner and corrugated medium are treated with the water-proofing agent prior to adhering the liner and corrugated medium.

2. A method as set forth in claim 1 wherein the water-proofing agent is dry prior to commencing the step of adhering the liner to the corrugated medium.

3. A method as set forth in claim 1 further comprising the step of adhering a second liner adhered to the corrugated medium on an opposite side thereof from the liner.

4. A method as set forth in claim 3 wherein the second liner is treated with the water-proofing agent on an inner surface thereof that is adhered to the corrugated medium prior to adhering the second liner and the corrugated medium.

5. A method as set forth in claim 1 wherein the water-proofing agent comprises a waxy material suspended in a solvent.

6. A method as set forth in claim 1 wherein the corrugated medium is formed from a wet slurry with the water-proofing agent present during formation of the corrugated medium from the wet slurry.

7. A method as set forth in claim 1 wherein the adhesive composition comprises: from 4.5 to 7.5 percent by weight of the carrier starch,
from 15 to 25 percent by weight of the uncooked pearl starch;
from 0.1 to 1.0 percent by weight of the borax;
from 1.5 to 3.0 percent by weight of the water-proofing resin;
from 1.5 to 3.0 percent by weight of the penetration-enhancing additive; and water, wherein all amounts are percent by weight based on the total weight of all components used to form the adhesive composition on a pre-cooking basis.

8. A method as set forth in claim 1 wherein the water-resistant corrugated paperboard is prepared in a corrugator having a single facer section including a pre-heater, a pressure roll, a corrugator roll, and an applicator roll.

9. A method as set forth in claim 8 wherein the liner treated with the water-proofing agent is contacted with the pre-heater prior to adhering the liner and the corrugated medium, with a side of the liner having a lower Cobb rating in contact with the pre-heater and with a side of the liner having a higher Cobb rating aligned to be adhered to the corrugated medium.

10. A method as set forth in claim 8, wherein a starch gap that controls an amount of adhesive applied to the liner in the single facer section of the corrugator is set from about 0.015 to about 0.025 inches.

* * * * *